INVENTOR.
PAUL D. GRIEM, JR.
BY
*Staehin Overman*
ATTORNEYS

May 23, 1967   P. D. GRIEM, JR   3,321,288
METHOD FOR CONTROLLING THE TEMPERATURE
OF HEAT-SOFTENABLE MATERIAL
Filed Feb. 28, 1964   2 Sheets-Sheet 2

INVENTOR.
PAUL D. GRIEM, JR.

BY
ATTORNEYS

United States Patent Office 3,321,288
Patented May 23, 1967

3,321,288
METHOD FOR CONTROLLING THE TEMPERATURE OF HEAT-SOFTENABLE MATERIAL
Paul D. Griem, Jr., Newark, Ohio, assignor to Owens-Corning Fiberglas Corporation, a corporation of Delaware
Filed Feb. 28, 1964, Ser. No. 348,203
2 Claims. (Cl. 65—17)

This invention relates to a method and apparatus for preparing heat-softenable material and more particularly to the operation of temperature control apparatus for regulating the temperature of heat-softenable material prior to forming it into bodies.

The method and apparatus according to the invention primarily are designed for controlling the temperature of heat-softenable, devitrifiable material, specifically glass, after it is melted and fined and prior to forming it into bodies and specifically small, elongate bodies or fibers. In what is known as the direct melt technique for producing glass fibers, glass batch is melted and fined in a large tank and then is directed to forehearths from which it flows into a plurality of fiber-forming devices. In the melting tank, the glass is melted and fined or held for a period of time sufficient to assure full melting of all portions of the batch and to enable bubbles of gas trapped in the glass to rise to the surface and escape. To accomplish these goals, the temperature of the glass is raised several hundred degrees above the minimum temperature at which it otherwise may be considered molten. At the high temperatures, however, the glass has too low a viscosity to be used for forming bodies and particularly fibers. Cooling is then necessary to decrease the temperature of the glass to a point at which a proper viscosity for forming or shaping is attained.

After the glass has been melted and fined, it is drawn from the tank through one or more main channels located at one end of the tank spaced from the point at which the batch is supplied. At least one temperature control zone is established in the main channel, in which zone the temperature of the glass is decreased below that at which it leaves the tank. The lower temperature is equal to the forming temperature in the case where only one temperature control zone is employed. Where two or more zones are used, the intermediate temperature of the glass after the first zone is below that at which it leaves the tank but still above the forming temperature, with the temperature of the glass being decreased to the forming temperature in the second zone.

Considerable cooling is usually necessary in order to decrease the glass temperature to that at which a proper viscosity can be obtained for forming. For example, the glass might leave the melting tank after fining at a temperature of 2250° F. with a temperature of 2020° F. required at the forming stations. If a large quantity of glass is flowing through the channel from the tank to the stations, then even more cooling will be required. On the other hand, if the rate at which the bodies or fibers are being made is low, and the glass is flowing slowly from the tank to the stations, then much less cooling will be required. This is not only due to the fact that less mass of glass is involved but also because the glass tends to cool naturally through heat losses between the tank and the stations and the slower the movement, the greater the heat loss. At times, the rate of flow of glass from the tank to the stations will be sufficiently low that the temperature of the glass will drop excessively primarily because of heat losses through the walls of the channel. In such an instance, heat must be supplied by the temperature control apparatus for the glass temperature to be maintained at the proper forming temperature when reaching the forming stations.

In temperature control apparatus heretofore employed, means for cooling and for heating the glass in a temperature control zone have been used. In these instances, the cooling means, usually in the form of cooling air, was operated alternately with the heating means, usually in the form of fuel-fired burners. It has been found, however, that this type of operation results in lack of control over the glass temperature, particularly when changing from minimum heating to minimum cooling.

In accordance with the invention, the temperature control apparatus referred to above is operated in a manner such that both the heating and cooling means are operated in cooperation with one another with both cooling air and combustion gases being controlled smoothly from minimum to maximum settings. In addition, the cooling air and combustible mixture are controlled so that even when one is firing at capacity, the other is never completely shut down but is operated at a small percent of capacity, five or ten percent for example.

A specific example of the invention will be set forth solely for the purpose of illustrating the invention and not for purposes of limitation. The maximum flow of glass which is expected through a channel from a melting tank to forming stations may be 800 pounds per hour while the minimum will be 400 pounds per hour. In such an instance, after calculating the heat losses in the channel, the heating and cooling requirements for the glass can be determined. The maximum and minimum settings for the cooling air and fuel valves can then be determined and set for the extremes of the range of glass flow rates. Thus, the fuel supply for the burners will be sufficient to supply enough heat to maintain the glass at the forming temperature when at the expected minimum flow. Similarly, the quantity of cooling air will be sufficient to provide the cooling required when the glass is flowing at the expected maximum rate. Of course, at these expected maximum and minimum flow rates, with the cooling air or fuel valve at maximum setting, the other will be at the minimum setting. For most intermediate flow rates, either the fuel or cooling air valve is operated at an intermediate setting while the other valve is at the minimum setting. For example, with a flow rate of 500 pounds per hour, the combustion air valve might be at 50 percent of its maximum open setting while the cooling air valve is at its minimum setting. At a rate of 750 pounds per hour, the cooling air valve might be at approximately 75 percent of its maximum setting while the fuel valve is at its minimum setting. At the midpoint of the range, either valve setting preferably is slightly above its minimum so that some overlap will occur.

The method and apparatus according to the invention result in slightly higher operating costs because of the extra amount of cooling air and fuel required for the minimum settings. However, the method and apparatus enable the glass temperature to be controlled more closely than heretofore possible resulting in an improved forming operation which more than offsets the increased fuel and cooling air costs. This is made possible principally because the glass is not subjected to the extreme range of temperature with the combustion products at, for example, a temperature of 2400° F. and the cooling air at, for example, 90° F. as has heretofore been the case. The thermal shock inherent in the previous type of operation hampered forming operations and often over-corrected a temperature differential in the glass thereby resulting in lower production rates and lower quality products. Also, the possibility of devitrification at the surface of the glass due to direct contact with unmoderated cooling air is also eliminated.

The invention further contemplates an improved control system for operating the fuel and air valves. The system is primarily electronic rather than pneumatic and accomplishes control of both valves with a single control unit. The system also is more accurate and reliable than those heretofore known.

It is, therefore, a principal object of the invention to provide an improved method and apparatus for controlling the temperature of glass located in a zone between a melting tank and a body-forming station, which method has the advantages outlined above.

Other objects and advantages of the invention will be apparent from the following detailed description of a preferred embodiment thereof, reference being made to the accompanying drawing, in which.

Figure 1:
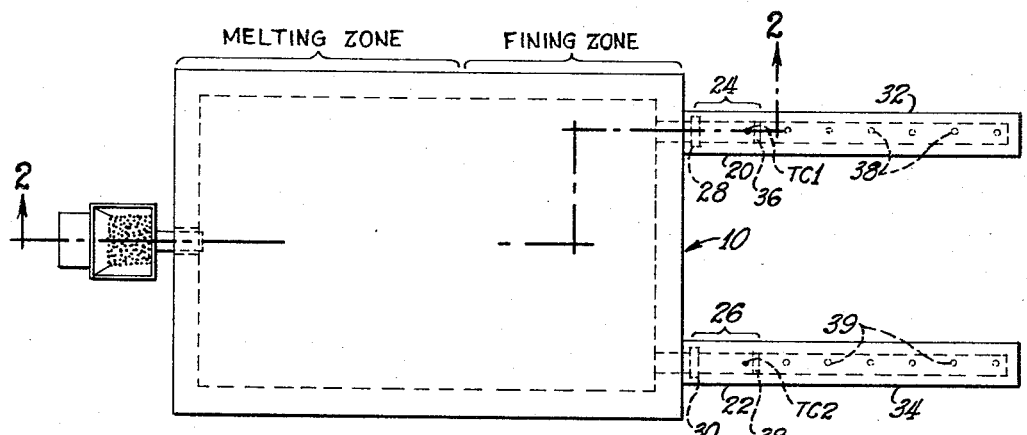
FIG. 1 is a schematic plan view of apparatus for melting and conditioning glass, and for directing the glass to a plurality of body-forming stations.
Figure 2:
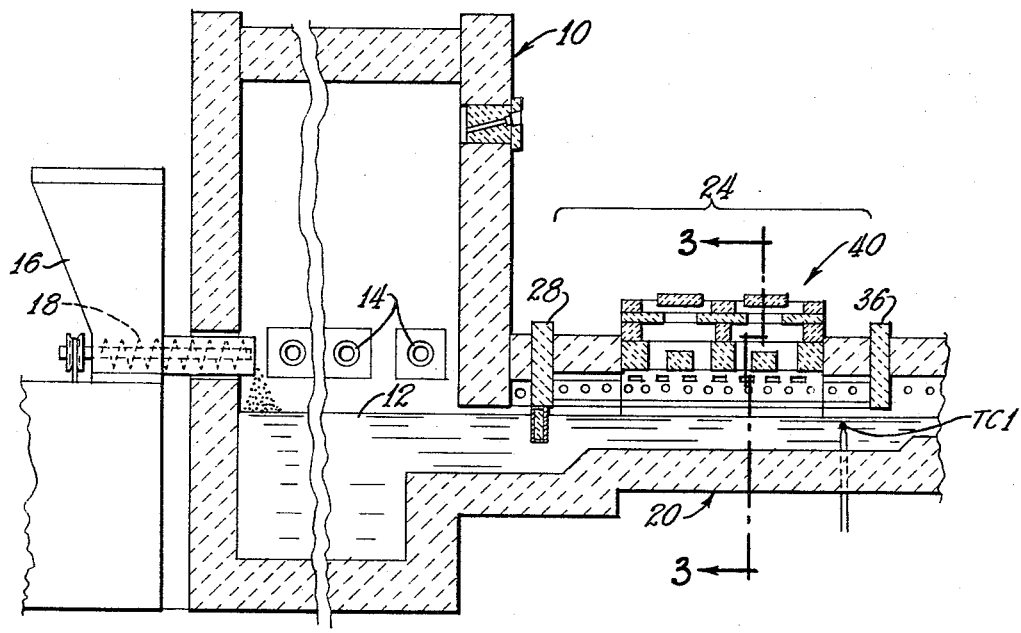
FIG. 2 is an enlarged, fragmentary view in vertical cross section taken along the line 2—2 of FIG. 1.

Referring particularly to FIGS. 1 and 2, a melting tank 10 is shown with a pool 12 of glass contained therein. The glass is melted by heat provided from suitable burners 14 located in the sidewalls of the tank 10 above the surface of the pool 12. Batch is fed to one end of the tank 10 from a batch supply hopper 16 by an auger 18 with the movement of the batch and glass being generally toward the right in FIGS. 1 and 2 through a melting zone and a fining zone as indicated in FIG. 1. The glass is melted at and heated to a temperature several hundred degrees above the minimum temperature at which the glass is ordinarily considered to be melted, in order to assure that all portions of the batch are fully melted and also to enable bubbles in the glass to collect, rise to the surface of the pool 12, and escape. For this purpose, the glass is maintained at the elevated temperature for a period of time in the fining zone. At this temperature, the glass is excessively fluid for use in forming bodies therefrom and its temperature subsequently must be decreased substantially to attain proper viscosity.

Figure 3:
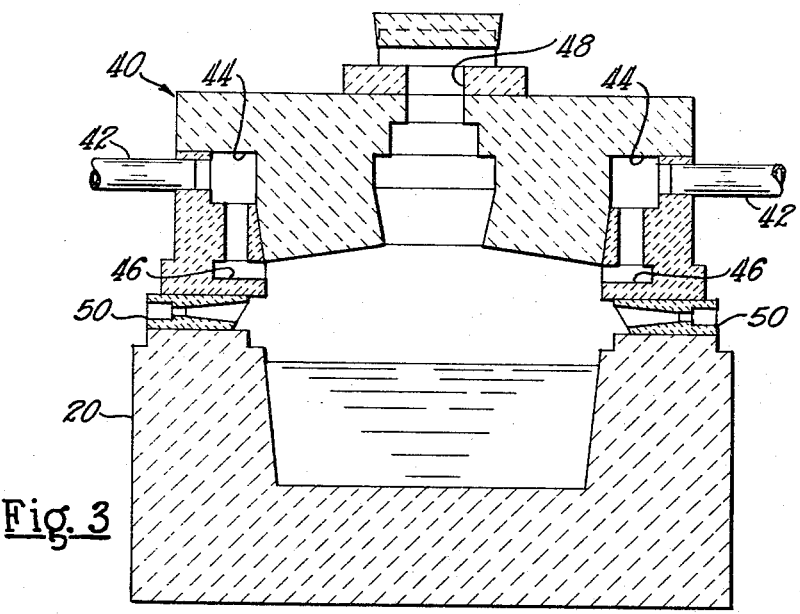
FIG. 3 is an enlarged view in transverse cross section of temperature control apparatus located in a temperature control zone and taken along the line 3—3 of FIG. 2.

The molten glass exits from the tank 10 through a pair of main channels 20 and 22 having temperature control zones 24 and 26. The temperature control zones 24 and 26 are separated from the melting tank 10 by baffles 28 and 30 which also serve as skimmers in this instance. Similarly, the zones 24 and 26 are separated from forehearths 32 and 34 by baffles 36 and 37, the forehearths containing a plurality of body- or fiber-forming stations 38 and 39. Within the zones 24 and 26 are temperature control apparatuses 40 (FIGS. 2 and 3), each of which are substantially identical. Cooling means for the temperature control apparatus 40 is effected by cooling air supplied through suitable pipes 42 to manifolds 44 and, thence, to cooling ports 46 which are located along the sidewalls above the level of the glass. The air emitted through the ports 46 is particularly effective in cooling the central portion of the glass while the outer edges of the glass are cooled to a greater extent by heat loss through the walls of the channel. The air from the ports 46 is exhausted ultimately through a central vent or flue 48.

The heating means for the temperature control apparatus 40 constitutes burners 50 which are located below the cooling air ports 46 to minimize possibility of excessive cooling of portions of the glass by concentrated contact with the cooling air.

Figure 4:
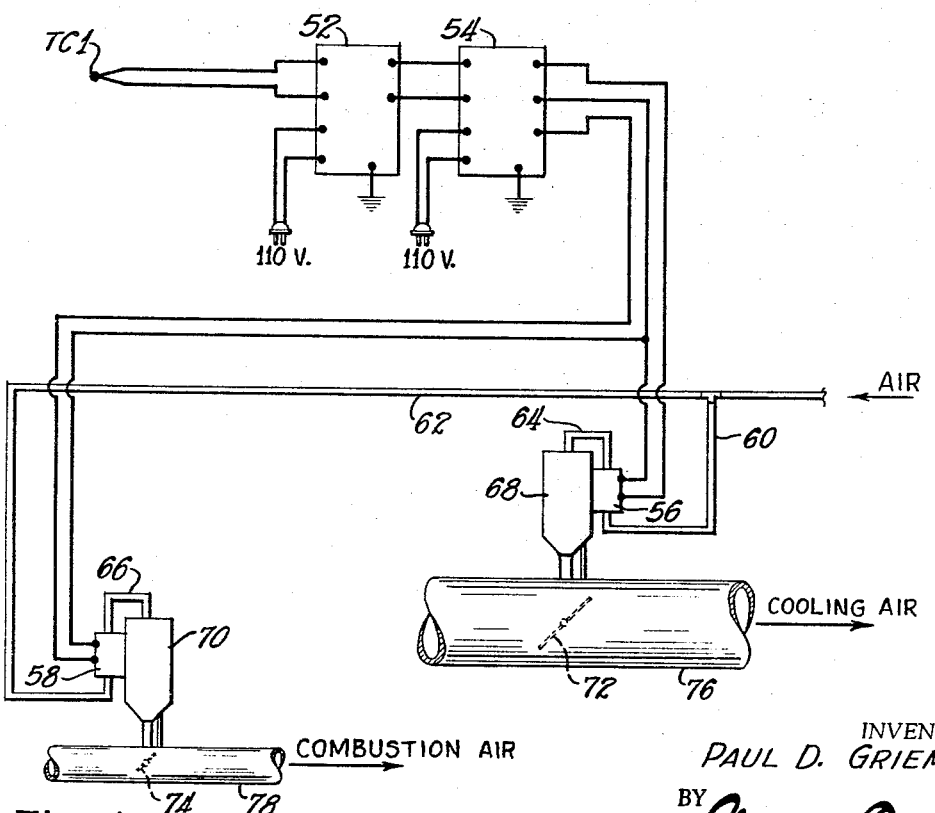
FIG. 4 is a diagrammatic view of controls used with the temperature control apparatus of FIG. 3.

Cooling air and the combustion gases for the ports 46 and the burners 50 are controlled and regulated by the controls shown in FIG. 4. Accordingly, the thermocouple TC1 is located downstream of the temperature control apparatus 40 and preferably a few inches below the surface of the glass. The signal from the thermocouple TC1 is fed to a commercially available E.M.F. converter 52 which amplifies the thermal signal and converts millivolts to milliamperes. The milliampere signal from the converter 52 is fed to a commercially available temperature indicating controller 54 which compares the input signal to a preset value and provides an output to adjust the heating and cooling valves until the set desired temperature is attained with the input signal matching the set point. From the controller 54, low voltage signals are fed to coils of two commercially available positioners 56 and 58 which convert the electric signals to pneumatic signals, the magnitudes of which are directly responsive to the electrical signals. For this purpose, air is supplied through lines 60 and 62 under constant pressure and the positioners 56 and 58 regulate the output pressures of the air in lines 64 and 66 connected to commercially available valve actuators 68 and 70. The actuators in turn operate butterfly valves 72 and 74 in response to the magnitude of the air pressure. The valve 72 is in a line 76 which supplies cooling air to the lines 42 for the ports 46. The valve 74 is in a line 78 which supplies combustion air to the burners 50. The combustion air aspirates fuel gas to form a combustible mixture for the burners in a manner well known in the art. Of course, the line 78 could equally well carry fuel gas which could be used to inspirate combustion air. In either case, the valve 74 can be termed a fuel valve because it controls the supply of fuel to the burners.

The positions of the valves 72 and 74 are controlled by the actuators 68 and 70 which are controlled by the air pressure supplied by the positioners 56 and 58. These air pressures are dependent, in turn, upon the electrical signals received by the positioners from the temperature-indicating controller 54.

When the expected range of glass flow rates has been determined, the valves can be arranged so that the maximum open setting for the air valve 72 will be established by the controls when the glass flow rate is near the top of the expected range, with the maximum open setting of the fuel valve 74 being established at the bottom of the range. On the other hand, the minimum settings for the air and fuel valve will be established by the controls near a midpoint of the flow rate range. If the glass flow rate is greater or less than the expected range, so that additional heating or cooling is required, this can be achieved by manually resetting the controls to change the maximum and minimum positions of the valves, for example. It can also be accomplished by manually adjusting additional valves in series with the valves 72 and 74, or by changing air and fuel pressures. Of course, the maximum fuel output is limited to the capacity of the burners employed. Another manner in which glass flow rates outside the expected range can be controlled from a temperature standpoint is through additional stand-by air ports and burners which can be cut in if or when needed.

In any event, the positions of the valves 72 and 74 are set so that when one is at its maximum, the other is at its minimum position, which preferably never is less than 5–10 percent of the maximum volume. With both the burners and cooling air operating with minimum settings, the glass is not subjected to the extreme temperatures of the combusted and combustible gases, which may be 2400° F. or more, or to the extreme temperatures of the cooling air, which may be in the order of 90° F., as has heretofore been the case.

In the preferred form of the invention, the fuel valve 74 and its associated controls are arranged so that the setting of the valve will decrease from maximum open to minimum as the flow rate of the glass increases from minimum to a point slightly beyond the midpoint of the flow rate range. Similarly, the air valve 72 and its associated controls are arranged so that the setting of the valve will increase from minimum to maximum as the flow rate of the glass increases from a point slightly below the midpoint of the range to the maximum. Further by way of example, with the expected glass flow rate to range from 400 to 800 pounds per hour, the position of the fuel valve 74 may decrease from maximum open to minimum when flow rate increases from 400 to 625 pounds per hour, while the position of the air valve 72 may increase from minimum to maximum when the glass flow rate increases from 575 to 800 pounds per hour. This, in practice, can be established by setting the positioners and actuators in a manner such that the fuel valve 74 moves from maximum to minimum position when the signal received by the corresponding positioner increases from 10 to 32 milliamperes, for example, while the setting for the air valve 72 increases from minimum to maximum as the milliamperes increase from 28 to 50, in the instance where the output of the controller unit is 10 to 50 milliamperes.

In accordance with the invention, the control system also is designed so that any given amount of movement of either valve will bring about an equal change in the temperature of the glass. For example, if the setting of the fuel valve 74 decreases from 60 percent to 40 percent of maximum and the temperature of the glass after stabilizing decreases 50° F., then an increase in the setting of the air valve 72 from 40 percent to 60 percent maximum should also bring about a decrease in the glass temperature of 50° F. This arrangement is built into the system through control of such factors as number and sizes of air ports and burners, air and fuel pressures, and sizes of air lines, orifices, and valves. By virtue of this arrangement, the entire heating and cooling operation is achieved through a single controlling unit represented by the controls 52 and 54, rather than separate controllers for both heating and cooling. The use of less controls makes the system more reliable with less maintenance costs, as well as being less expensive with chance for error being less.

Various modifications of the above described embodiment of the invention will be apparent to those skilled in the art and it is to be understood that such modifications can be made without departing from the scope of the invention if they are within the spirit and the tenor of the accompanying claims.

I claim:

1. In a method for delivering molten glass to a glass working operation through a temperature control zone at rates of flow according to the rate of withdrawal of the glass at the glass working operation, including the steps of supplying cooling air over the molten glass flowing through the zone, and supplying hot combustion gases over the glass flowing through the zone, the improvement comprising simultaneously and continuously supplying both cooling air and hot gases over the molten glass in the zone and varying at least one of the volumes of said cooling air and hot gases to maintain the temperature of the glass downstream of the zone substantially constant.

2. In a method for delivering molten glass from a furnace through a temperature control zone to a fiber-forming operation at a rate of flow equal to the rate at which fibers are formed at the fiber-forming operation, including the steps of supplying cooling air over the molten glass flowing through the zone, and supplying hot combustion gases over the glass flowing through the zone, the improvement comprising simultaneously and continuously supplying both cooling air and hot gases over the molten glass in the zone, and varying at least one of the volumes of said cooling air and hot gases to maintain the temperature of the glass downstream of the zone substantially constant.

References Cited by the Examiner

UNITED STATES PATENTS

| 1,937,321 | 10/1933 | Howard | 65—162 |
| 2,098,625 | 10/1937 | Honiss | 65—137 |
| 2,649,903 | 8/1953 | Russell | 65—337 |
| 2,999,511 | 9/1961 | Chew | 65—161 |
| 3,010,657 | 11/1961 | Post | 65—162 |

DONALL H. SYLVESTER, *Primary Examiner.*

G. R. MYERS, *Assistant Examiner.*